United States Patent
Barillaud et al.

(10) Patent No.: US 9,330,681 B2
(45) Date of Patent: May 3, 2016

(54) VOICE SIGNAL MODULATION SERVICE FOR GEOGRAPHIC AREAS

(71) Applicant: International Business Machines Corporation, Armonk, NY (US)

(72) Inventors: Franck Barillaud, Austin, TX (US); Insoo Cho, Pittsburgh, PA (US); Dan Christiani, Rochester, NY (US); Mark R. Thill, Seattle, WA (US); David S. Zhang, Norcross, GA (US)

(73) Assignee: International Business Machines Corporation, Armonk, NY (US)

( * ) Notice: Subject to any disclaimer, the term of this patent is extended or adjusted under 35 U.S.C. 154(b) by 15 days.

(21) Appl. No.: 14/332,729

(22) Filed: Jul. 16, 2014

(65) Prior Publication Data

US 2016/0019912 A1  Jan. 21, 2016

(51) Int. Cl.
G10L 21/013 (2013.01)
G10L 15/02 (2006.01)
G10L 25/27 (2013.01)
G10L 25/48 (2013.01)

(52) U.S. Cl.
CPC .............. G10L 25/48 (2013.01); G10L 15/02 (2013.01); G10L 25/27 (2013.01); G10L 2021/0135 (2013.01)

(58) Field of Classification Search
CPC ..... G10L 21/00; G10L 21/003; G10L 21/007; G10L 21/01; G10L 21/013; G10L 2021/0135; G10L 21/0316; G10L 21/0324; G10L 21/0332; G10L 21/034; G10L 21/057; G10L 21/18
See application file for complete search history.

(56) References Cited

U.S. PATENT DOCUMENTS

| | | | |
|---|---|---|---|
| 4,465,465 A * | 8/1984 | Nelson | 434/112 |
| 6,598,021 B1 | 7/2003 | Shambaugh et al. | |
| 2003/0050536 A1* | 3/2003 | Hood et al. | 600/300 |
| 2003/0100345 A1* | 5/2003 | Gum | 455/563 |
| 2004/0130449 A1* | 7/2004 | Hung | 340/573.1 |
| 2005/0050093 A1* | 3/2005 | Atkin et al. | 707/104.1 |
| 2005/0058270 A1* | 3/2005 | Allen et al. | 379/220.01 |

(Continued)

FOREIGN PATENT DOCUMENTS

EP    1727127 A1    11/2006

OTHER PUBLICATIONS

"An average voice is beautiful, say scientists," Phys Org, Jan. 2010, 7 pages, accessed Jul. 16, 2014. http://phys.org/news183666976.html.

(Continued)

*Primary Examiner* — Eric Yen
(74) *Attorney, Agent, or Firm* — Yee & Associates, P.C.; Steven Bennett

(57) ABSTRACT

Modulating a voice signal is provided. The voice signal corresponding to a voice communication is received from a sending voice communication device via a network. Voice signal features corresponding to the voice communication are extracted. A set of voice signal filters are selected to modulate the extracted voice signal features corresponding to the voice communication to an average voice signal associated with a geographic area where the voice communication is destined for. The voice signal features corresponding to the voice communication are modulated by applying the selected set of voice signal filters to generate the average voice signal associated with the geographic area where the voice communication is destined for.

20 Claims, 4 Drawing Sheets

(56) References Cited

U.S. PATENT DOCUMENTS

| | | | |
|---|---|---|---|
| 2006/0277105 A1* | 12/2006 | Harris | 705/14 |
| 2006/0291640 A1* | 12/2006 | Nagesh et al. | 379/211.02 |
| 2009/0182768 A1* | 7/2009 | Stevens et al. | 707/102 |
| 2010/0043039 A1* | 2/2010 | Price et al. | 725/109 |
| 2011/0106527 A1 | 5/2011 | Chiu | |
| 2013/0070911 A1 | 3/2013 | O'Sullivan | |
| 2013/0246072 A1 | 9/2013 | Duffield | |

OTHER PUBLICATIONS

"Voxal Voice Changer—Real-time voice changing software," NCH Software, undated, 1 page, accessed Jul. 16, 2014. http://www.nchsoftware.com/voicechanger/index.html.

* cited by examiner

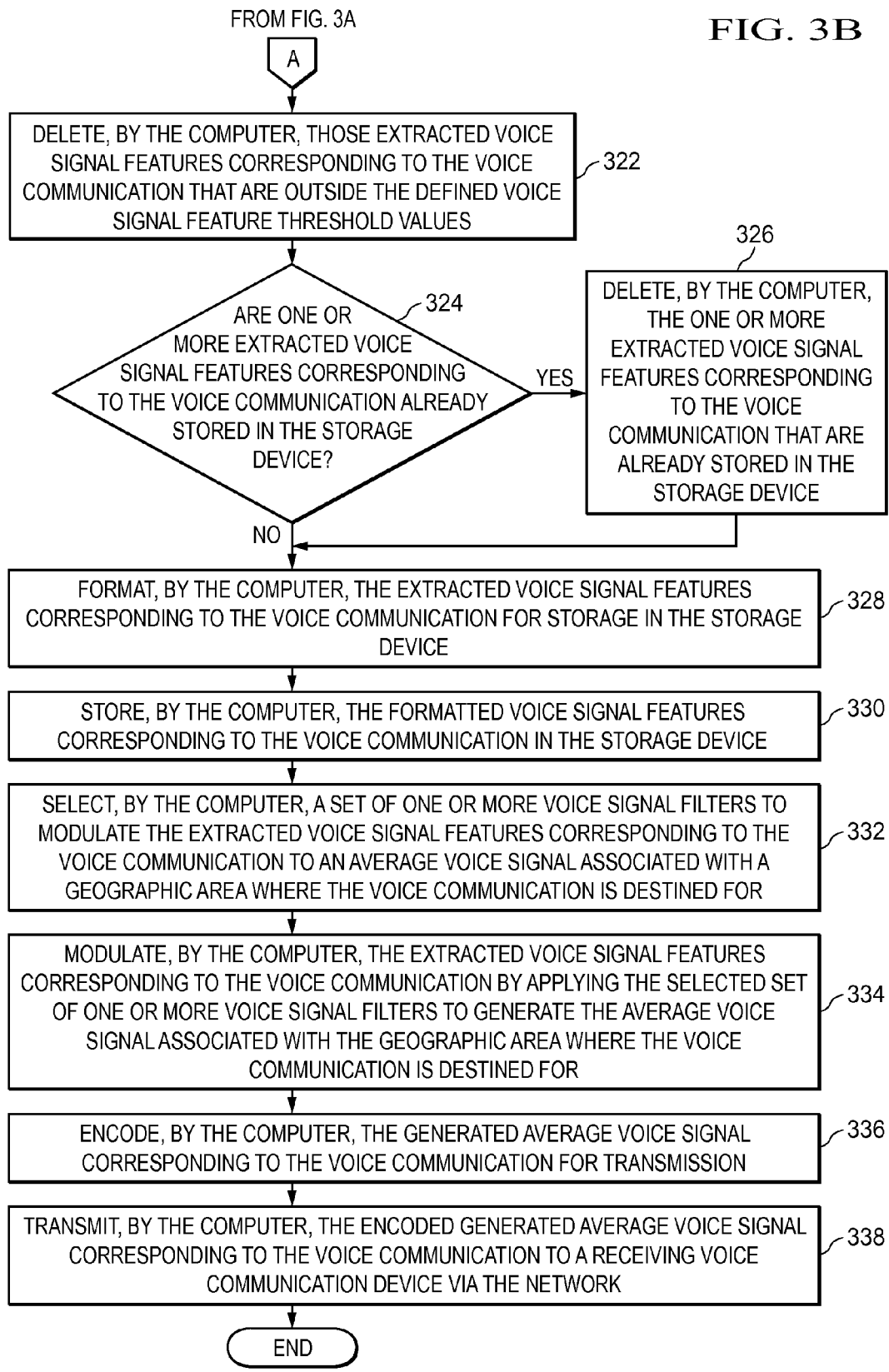

VOICE SIGNAL MODULATION SERVICE FOR GEOGRAPHIC AREAS

BACKGROUND

1. Field

The disclosure relates generally to voice communication via a network and more specifically to modulating a voice signal corresponding to a voice communication to change the voice signal to an average voice signal that is within defined minimum and maximum voice signal threshold limits set for voices of people living in a geographic area that is the intended destination for the voice communication.

2. Description of the Related Art

Innovations in communications technologies have made a wide range of enhanced communications services available to a user. For example, a user may dial a telephone number at the press of a key using speed-dialing, retrieve telephone numbers of missed calls, view telephone numbers of incoming calls on a display using caller identification (caller ID), and send or retrieve voice messages using voice mail. A communications provider often provides these types of services through a network, such as an intelligent services network (ISN) that is privately owned, but also may work in conjunction with a public switched telephone network (PSTN), for example.

SUMMARY

According to one illustrative embodiment, a method for modulating a voice signal is provided. A computer receives the voice signal corresponding to a voice communication from a sending voice communication device via a network. The computer extracts voice signal features corresponding to the voice communication. The computer selects a set of voice signal filters to modulate the extracted voice signal features corresponding to the voice communication to an average voice signal associated with a geographic area where the voice communication is destined for. The computer modulates the voice signal features corresponding to the voice communication by applying the selected set of voice signal filters to generate the average voice signal associated with the geographic area where the voice communication is destined for. According to other illustrative embodiments, a computer system and a computer program product for modulating a voice signal are provided.

BRIEF DESCRIPTION OF THE SEVERAL VIEWS OF THE DRAWINGS

FIGS. 3A-3B are a flowchart illustrating a process for modulating a voice signal in accordance with an illustrative embodiment.

DETAILED DESCRIPTION

Figure 1:
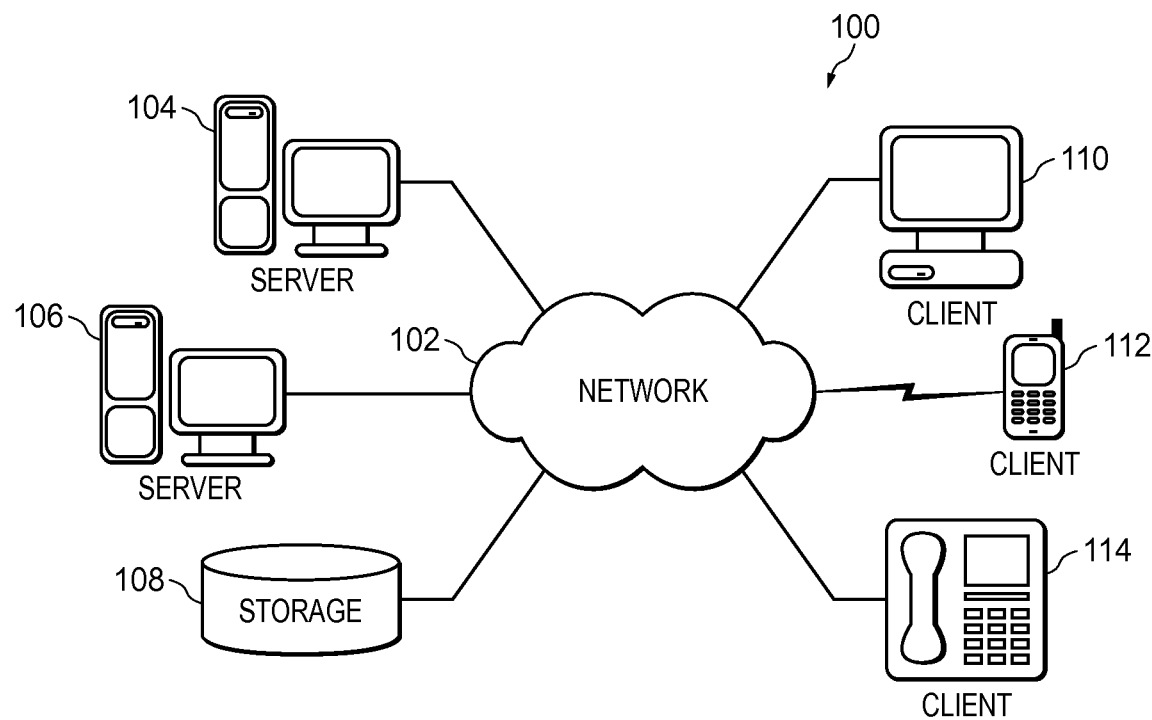
FIG. 1 is a pictorial representation of a network of data processing systems in which illustrative embodiments may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer readable program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
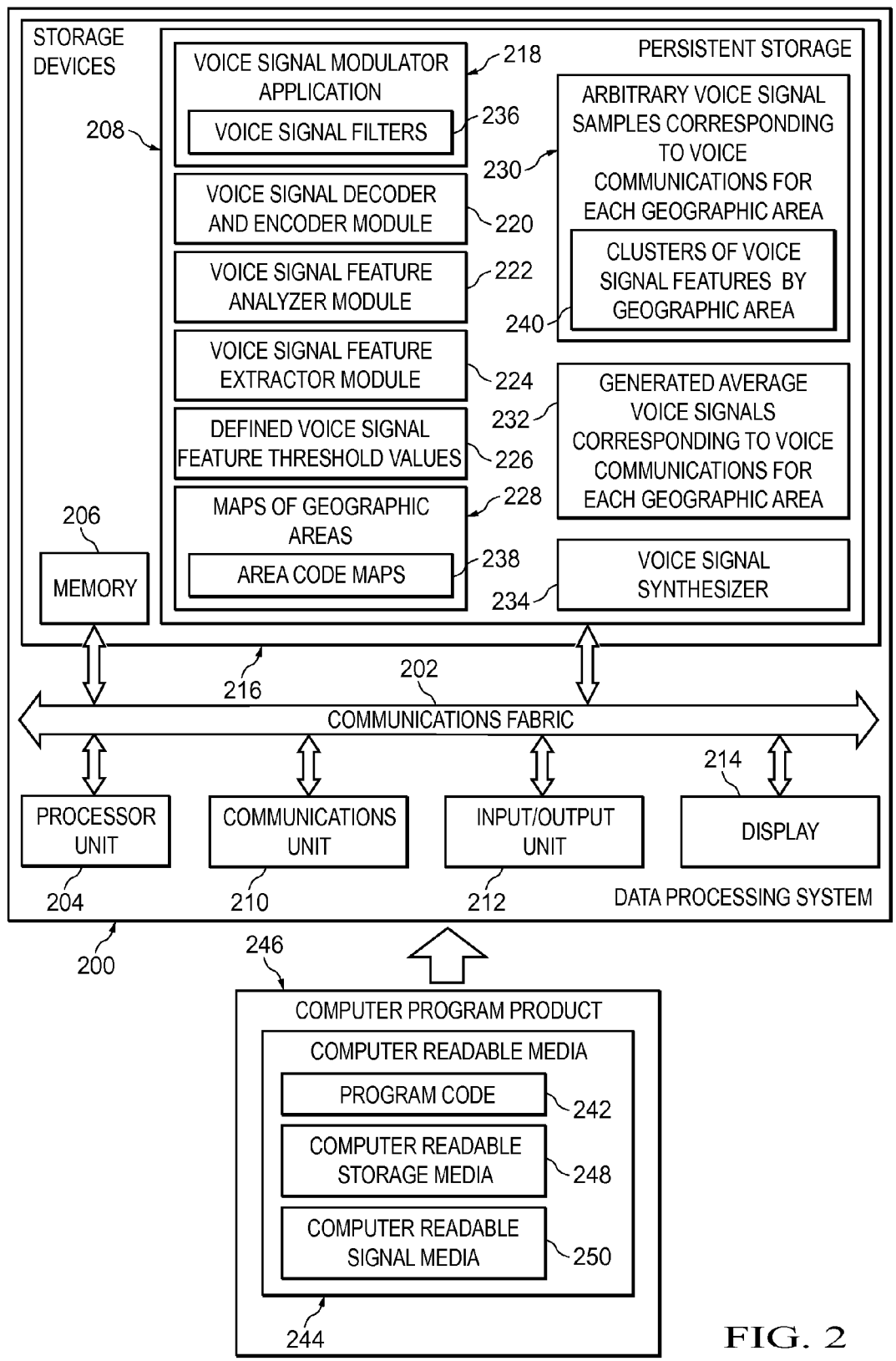
FIG. 2 is a diagram of a data processing system in which illustrative embodiments may be implemented.

With reference now to the figures, and in particular, with reference to FIG. 1 and FIG. 2, diagrams of data processing environments are provided in which illustrative embodiments may be implemented. It should be appreciated that FIG. 1 and FIG. 2 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, voice communication devices, and other devices in which the illustrative embodiments may be implemented. Network data processing system 100 contains network 102, which is the medium used to provide communications links between the computers, voice communication devices, and the other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102. In addition, server 104 and server 106 may provide a set of one or more services to client devices connected to network 102. For example, server 104 and server 106 may provide one or more voice modulation services corresponding to voice communications of users using the client devices. A voice modulation service is a process that changes, modifies, standardizes, or normalizes an original incoming voice signal corresponding to a particular voice communication to an average voice signal, which is within defined minimum and maximum voice signal feature threshold limits, associated with voices of a population living within a particular geographic area that is the intended destination of the voice communication.

Client device 110, client device 112, and client device 114 also connect to network 102. Client devices 110, 112, and 114 are clients to server 104 or server 106. In the depicted example, server 104 or server 106 may provide information, such as boot files, operating system images, and applications to client devices 110, 112, and 114. Users of client devices 110, 112, and 114 may utilize client devices 110, 112, and 114 to access the voice modulation services provided by server 104 or server 106.

In this example, client device 110 is a personal desktop computer, client device 112 is a wireless telephone, and client device 114 is a standard landline telephone. However, it should be noted that client devices 110, 112, and 114 are intended as examples only. For example, client devices 110, 112, and 114 may be smart phones, cellular telephones, laptop computers, handheld computers, personal digital assistants, smart watches, or gaming devices with wireless or wire communication links to network 102. In addition, client devices 110, 112, and 114 may represent any combination of different voice communication devices connected to network 102.

Storage 108 is a network storage device capable of storing data in a structured format or unstructured format. Storage 108 may provide storage of a plurality of different user names and associated identification numbers; user profiles; and user account information associated with a voice modulation service network. Storage 108 also may store voice signal modulation applications, voice signal feature analyzer modules, voice signal feature extractor modules, defined minimum and maximum voice signal feature threshold values corresponding to each different geographic area in a plurality of predefined geographic areas, maps defining the different geographic areas, clusters of voice signal samples for each of the different geographic areas, and generated average voice signals for each of the different geographic areas. Further, storage unit 108 may store other data, such as authentication or credential data that may include user names, passwords, and biometric data associated with the plurality of users and system administrators. It should be noted that storage unit 108 may store any data that may be utilized by the voice modulation service network.

In addition, it should be noted that network data processing system 100 may include any number of additional server devices, client devices, and other devices not shown. Program code located in network data processing system 100 may be stored on a computer readable storage medium and downloaded to a computer or other data processing device for use.

For example, program code may be stored on a computer readable storage medium on server 104 and downloaded to client device 110 over network 102 for use on client device 110.

In the depicted example, network data processing system 100 may be implemented as a number of different types of communication networks, such as, for example, an internet, an intranet, a local area network (LAN), and a wide area network (WAN). FIG. 1 is intended as an example, and not as an architectural limitation for the different illustrative embodiments.

With reference now to FIG. 2, a diagram of a data processing system is depicted in accordance with an illustrative embodiment. Data processing system 200 is an example of a computer, such as server 104 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications or programs that may be loaded into memory 206. Processor unit 204 may be a set of one or more processors or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of computer readable storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device does not include a propagation medium. Memory 206, in these examples, may be, for example, a random access memory, or any other suitable volatile or non-volatile storage device.

Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores voice signal modulator application 218, voice signal decoder and encoder module 220, voice signal feature analyzer module 222, voice signal feature extractor module 224, defined voice signal feature threshold values 226, maps of geographic areas 228, arbitrary voice signal samples corresponding to voice communications for each geographic area 230, generated average voice signals corresponding to voice communications for each geographic area 232, and voice signal synthesizer 234. However, it should be noted that persistent storage 208 may store any type of application, program, module, and data utilized by the different illustrative embodiments.

Voice signal modulator application 218 is a software program that converts an incoming original voice signal corresponding to a voice communication to an average voice signal, which is within a minimum and maximum voice signal threshold value range, corresponding to a geographic destination for the voice communication. Voice signal modulator application 218 includes voice signal filters 236. Voice signal filters 236 are a set of two or more combinable voice signal filters. Combinable means that two or more of the voice signal filters may be used at the same time and used in different combinations to produce an average voice signal for a particular geographic area. In addition, voice signal modulator application 218 may utilize different combinations of voice signal filters 236 to alter the generated average voice signal to sound, for example, like a male voice or a female voice or to produce different pitches or frequencies of voice so that the same average voice signal is not generated for the same geographic area all the time.

Voice signal modulator application 218 uses voice signal decoder and encoder module 220 to decode incoming original voice signals corresponding to voice communications from sending voice communication devices and encode outgoing generated average voice signals for transmission to receiving voice communication devices. Voice signal modulator application 218 uses voice signal feature analyzer module 222 to determine voice signal features of a voice communication, such as pitch, pace, pauses, frequency, amplitude, accent, inflection, speech pattern, phonemes, words, phrases, geographic origin, geographic destination, et cetera. Voice signal modulator application 218 uses voice signal feature extractor module 224 to extract the determined voice signal features from a voice communication.

Defined voice signal feature threshold values 226 are predefined minimum and maximum voice signal feature threshold values. Illustrative embodiments may utilize a different set of defined minimum and maximum voice signal feature threshold values for each different geographic area. Voice signal modulator application 218 uses defined voice signal feature threshold values 226 to identify and remove those voice signal features corresponding to a voice communication that are outside the minimum and maximum threshold value range.

Maps of geographic areas 228 define the different geographic areas. A geographic area may be defined, for example, as a city, state, region, country, continent, or any other type of geographic division. For example, maps of geographic areas 228 include area code maps 238. Using area code maps 238, voice signal modulator application 218 may define a geographic area based on one or more area codes. Voice signal modulator application 218 may utilize maps of geographic areas 228 to determine a geographic area origin of a voice communication or a geographic area destination for a voice communication to determine the appropriate voice signal filters and voice signal threshold values to apply to a particular voice communication to generate the appropriate average voice signal for the voice communication.

Arbitrary voice signal samples corresponding to voice communications for each geographic area 230 are collections of general voice signals corresponding to voice communications of populations in the different defined geographic areas. Voice signal modulator application 218 may utilize a clustering process, for example, to group the different voice signals associated with the different geographic areas into different clusters to form clusters of voice signal features by geographic area 240. Voice signal modulator application 218 may utilize clusters of voice signal features by geographic area 240 to determine comparable voice signal features for voice communications. Generated average voice signals corresponding to voice communications for each geographic area 232 are the average voice signals generated by voice signal modulator application 218 for the different defined geographic areas. Voice signal synthesizer 234 is a software component that is capable of independently generating an average voice signal for a particular geographic area from scratch without relying on received voice signals.

Communications unit 210, in this example, provides for communication with voice communication devices, such as client devices 110, 112, and 114 in FIG. 1, and other devices, such as server device 106 and storage device 108 in FIG. 1. Communications unit 210 may provide communications through the use of either or both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), bluetooth technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, and/or some other suitable input device. Display 214 provides a mechanism to display information to a user, such as system administrator.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer implemented instructions, which may be located in a memory, such as memory 206. These instructions are referred to as program code, computer usable program code, or computer readable program code that may be read and run by a processor in processor unit 204. The program code, in the different embodiments, may be embodied on different physical computer readable storage devices, such as memory 206 or persistent storage 208.

Program code 242 is located in a functional form on computer readable media 244 that is selectively removable and may be loaded onto or transferred to data processing system 200 for running by processor unit 204. Program code 242 and computer readable media 244 form computer program product 246. In one example, computer readable media 244 may be computer readable storage media 248 or computer readable signal media 250. Computer readable storage media 248 may include, for example, an optical or magnetic disc that is inserted or placed into a drive or other device that is part of persistent storage 208 for transfer onto a storage device, such as a hard drive, that is part of persistent storage 208. Computer readable storage media 248 also may take the form of a persistent storage, such as a hard drive, a thumb drive, or a flash memory that is connected to data processing system 200. In some instances, computer readable storage media 248 may not be removable from data processing system 200.

Alternatively, program code 242 may be transferred to data processing system 200 using computer readable signal media 250. Computer readable signal media 250 may be, for example, a propagated data signal containing program code 242. For example, computer readable signal media 250 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 242 may be downloaded over a network to persistent storage 208 from another device or data processing system through computer readable signal media 250 for use within data processing system 200. For instance, program code stored in a computer readable storage media in a data processing system may be downloaded over a network from the data processing system to data processing system 200. The data processing system providing program code 242 may be a server computer, a client computer, or some other device capable of storing and transmitting program code 242.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 248 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more other devices used to transmit and receive data, such as a modem or a network adapter. Further, a memory may be, for example, memory 206 or a cache such as found in an interface and memory controller hub that may be present in communications fabric 202.

In the course of developing illustrative embodiments it was discovered that when communicating using a telephone, some speakers may speak with volume levels that are too loud or too soft for a listener to comfortably or easily listen to the speaker. In addition, some speakers may speak with regional accents that are difficult for a listener to understand, especially if the listener is located in a different geographic region that speaks with a different accent. Illustrative embodiments utilize voice signal modulators that change an original voice signal corresponding to a voice communication to reflect an average voice signal associated with a geographic destination of the voice communication with regard to voice signal features or qualities, such as, for example, accent, pace, pitch, volume, et cetera.

Illustrative embodiments may provide the voice signal modulators as a service to one or more voice communication companies. The voice communication companies may be, for example, telecommunication companies that provide telephone communication services to customers or internet service providers that provide voice over internet protocol (VoIP) communication services to their customers. The voice communication companies may utilize the voice modulator service of illustrative embodiments to provide their customers located in different geographic areas with clarity of voice communication, familiarity of the listener with the regional speech pattern, and ease of communication. Illustrative embodiments modulate these person to person voice communications to average voice signals corresponding to the different geographic areas.

A voice communication company utilizing the voice signal modulation service of illustrative embodiments may initially record all voice communications corresponding to a defined geographic area and then extract from the voice communications the different voice signal features, such as phonemes, words, pauses, speech patterns, and the like. Using this collected voice signal data, illustrative embodiments can compute and generate an average voice signal for the defined geographic area, such as, for example, the South or West Coast of the United States. An average voice signal for a geographic area is a high quality voice signal that lies within minimum and maximum voice signal feature threshold values defined for that particular geographic area. Illustrative embodiments may run an evolutionary algorithm on the voice signal data to generate a fitness function for modulating an arbitrary voice signal into an average voice signal.

The population of a given geographic area may be tested using a pool of distinct voice signal types. This may possibly be found by doing clustering of the voice signal data for the given geographic area on dimensions defined by a voice signal comparison function. Then, illustrative embodiments compare the distinct voice signal types of the population with the calculated average voice signal for the given geographic area. Illustrative embodiments may model the voice signal modulation service as, for example, a series of voice signal filters that may be used or combined at the same time, which enables the evolutionary algorithm approach.

Alternatively, the voice signal modulation service may work by recognizing speech and using a speech synthesizer to translate a received original voice signal to an average voice signal corresponding to a particular geographic destination of a voice communication. Because illustrative embodiments may overuse a particular average voice signal for voice communications within a particular geographic area, illustrative embodiments may apply a random voice signal filter to give voice communications a more individualized feeling. In other words, illustrative embodiments are not limited to using the same average voice signal for every voice communication within a given geographic area.

A telemarketing company may, for example, contact their voice communication company to contract for the voice signal modulation service of illustrative embodiments. When any of the telemarketers of the telemarketing company starts to make a voice communication connection after contracting for the service, the voice communication company detects that a telemarketer is making a call and automatically redirects the voice communication traffic to a local voice signal modulation service. As a result of using the local voice signal modulation service, the voice signal quality of a telemarketer is improved, which may increase sales because of clarity of the voice communication, the familiarity of the listener with the average pattern of speech for the called person's geographic area, and ease of communication. Thus, illustrative embodiments of the present invention provide a method, computer system, and computer program product for modulating a voice signal of a voice communication to an average voice signal for a particular geographic area using a set of voice signal filters.

Figure 3A:
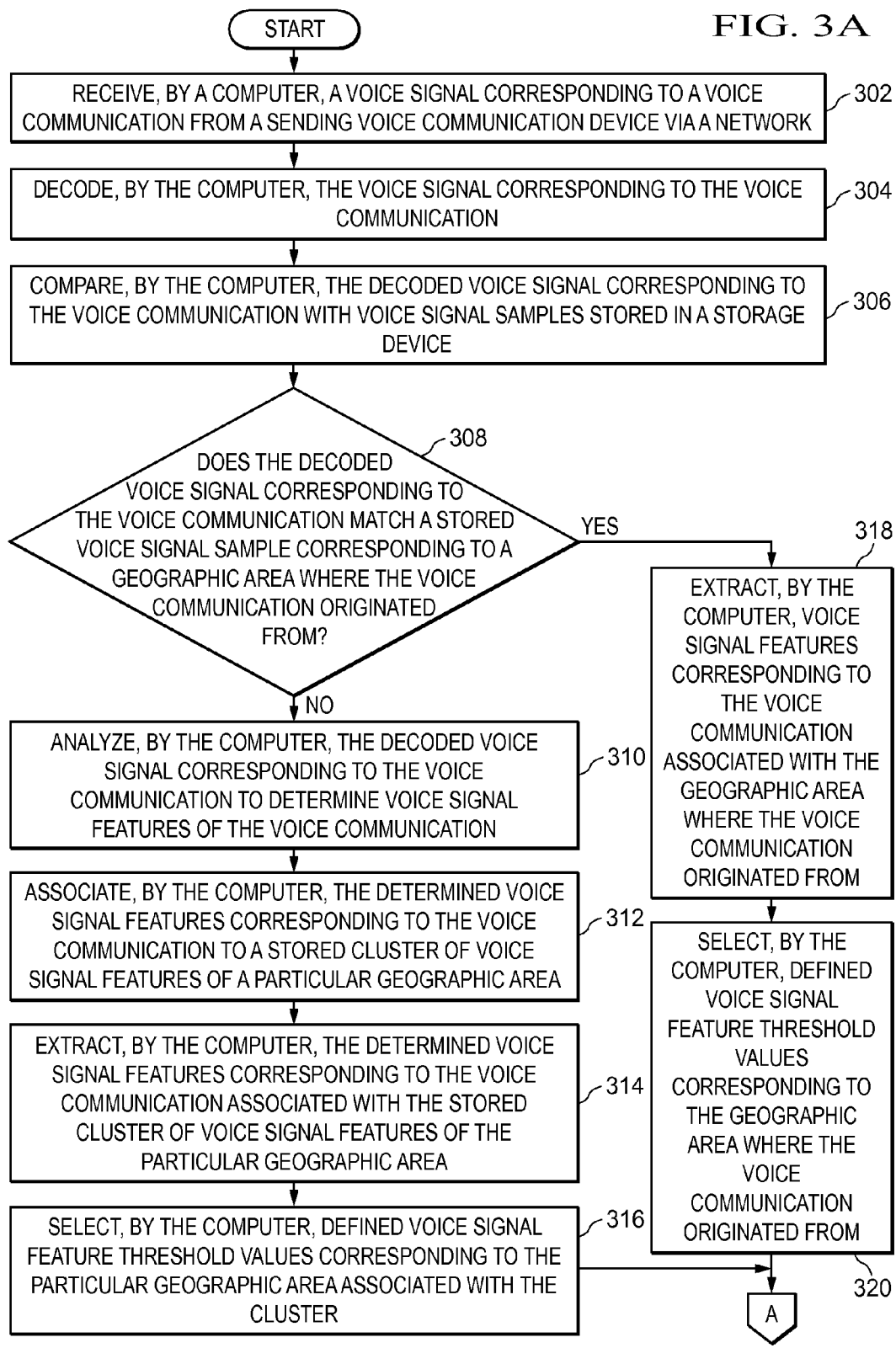

With reference now to FIGS. 3A-3B, a flowchart illustrating a process for modulating a voice signal is shown in accordance with an illustrative embodiment. The process shown in FIGS. 3A-3B may be implemented in a computer, such as, for example, server 104 in FIG. 1 and data processing system 200 in FIG. 2.

The process begins when the computer receives a voice signal corresponding to a voice communication from a sending voice communication device via a network (step 302). The sending voice communication device may be, for example, client device 110 in FIG. 1. The network may be, for example, network 102 in FIG. 1.

After receiving the voice signal corresponding to the voice communication in step 302, the computer decodes the voice signal (step 304). The computer may utilize a voice signal decoder and encoder module, such as voice signal decoder and encoder module 220 in FIG. 2, to decode the voice signal. In addition, the computer compares the decoded voice signal corresponding to the voice communication with voice signal samples stored in a storage device (step 306). The voice signal samples may be, for example, arbitrary voice signal samples corresponding to voice communications for each geographic area 230 in FIG. 2. The storage device may be, for example, storage device 108 in FIG. 1 or persistent storage device 208 in FIG. 2.

Subsequently, the computer makes a determination as to whether the decoded voice signal corresponding to the voice communication matches a stored voice signal sample corresponding to a geographic area where the voice communication originated from (step 308). The geographic area may be, for example, a geographic area defined by maps of geographic areas 228 or area code maps 238 in FIG. 2. If the computer determines that the decoded voice signal corresponding to the voice communication does not match a stored voice signal sample corresponding to a geographic area where the voice communication originated from, no output of step 308, then the computer analyzes the decoded voice signal corresponding to the voice communication to determine voice signal features of the voice communication (step 310). The voice signal features may be, for example, pitch of the voice signal, frequency of the voice signal, volume of the voice signal, pace of the voice signal, human introduced speech accents into the voice signal, geographic origin of the voice signal, and the like.

Further, the computer associates the determined voice signal features corresponding to the voice communication to a stored cluster of voice signal features of a particular geographic area (step 312). The cluster of voice signal features corresponding to a particular geographic area may be, for example, a cluster within clusters of voice signal features by geographic area 240 in FIG. 2. Furthermore, the computer extracts the determined voice signal features corresponding to the voice communication associated with the stored cluster of voice signal features of the particular geographic area (step 314).

In addition, the computer selects defined voice signal feature threshold values corresponding to the particular geographic area associated with the cluster (step 316). The defined voice signal feature threshold values corresponding to the particular geographic area may be, for example, defined voice signal features threshold values 226 in FIG. 2. Thereafter, the process proceeds to step 322.

Returning again to step 308, if the computer determines that the decoded voice signal corresponding to the voice communication does match a stored voice signal sample corresponding to a geographic area where the voice communication originated from, yes output of step 308, then the computer extracts voice signal features corresponding to the voice communication associated with the geographic area where the voice communication originated from (step 318). The computer also selects defined voice signal feature threshold values corresponding to the geographic area where the voice communication originated from (step 320). In addition, the computer deletes those extracted voice signal features corresponding to the voice communication that are outside the defined voice signal feature threshold values (step 322).

Further, the computer makes a determination as to whether one or more extracted voice signal features corresponding to the voice communication are already stored in the storage device (step 324). If the computer determines that one or more of the extracted voice signal features corresponding to the voice communication are already stored in the storage device, yes output of step 324, then the computer deletes the one or more extracted voice signal features corresponding to the voice communication that are already stored in the storage device (step 326). Thereafter, the process proceeds to step 328.

If the computer determines that the extracted voice signal features corresponding to the voice communication are not already stored in the storage device, no output of step 324, then the computer formats the extracted voice signal features corresponding to the voice communication for storage in the storage device (step 328). Afterward, the computer stores the formatted voice signal features corresponding to the voice communication in the storage device (step 330). In addition, the computer selects a set of one or more voice signal filters to modulate the extracted voice signal features corresponding to the voice communication to an average voice signal associated with a geographic area where the voice communication is destined for (step 332). The selected set of voice signal filters may be, for example, a set of voice signal filters selected from voice signal filters 236 in FIG. 2.

Subsequently, the computer modulates the extracted voice signal features corresponding to the voice communication by applying the selected set of one or more voice signal filters to generate the average voice signal associated with the geographic area where the voice communication is destined for (step 334). The generated average voice signal may be, for example, an average voice signal within generated average voice signals corresponding to voice communications for each geographic area 232 in FIG. 2. The computer also encodes the generated average voice signal corresponding to the voice communication for transmission (step 336). Then, the computer transmits the encoded generated average voice signal corresponding to the voice communication to a receiving voice communication device via the network (step 338). The receiving voice communication device may be, for example, client device 112 in FIG. 1. The process terminates thereafter.

Thus, illustrative embodiments provide a method, computer system, and computer program product for modulating a voice signal corresponding to a voice communication to an average voice signal associated with a particular geographic area where the voice communication is destined for using a selected set of combinable voice signal filters. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for modulating a voice signal, the method comprising:
   receiving, by a computer, a voice signal representing a voice communication sent via a network from a voice communication device;
   extracting, by the computer, selected voice signal features including pitch, pace, pauses, frequency, amplitude, accent, inflection, speech pattern, phonemes, words, phrases, geographic origin, and geographic destination from the voice signal received;
   selecting, by the computer, a set of voice signal filters used to modulate the voice signal features extracted from the voice signal received to an average voice signal associated with a geographic area of a destination of the voice communication; and
   modulating, by the computer, the voice signal features extracted from the voice signal received using the set of voice signal filters selected which modulate the voice features extracted to generate the average voice signal, of the voice signal received, associated with the geographic area of the destination of the voice communication.

2. The method of claim 1, further comprising:
   comparing, by the computer, the voice signal received with voice signal samples stored in a storage device;
   determining, by the computer, whether the voice signal received matches a voice signal sample of the voice signal samples stored corresponding to a geographic area which is an origin of the voice communication;
   responsive to determining, by the computer, that the voice signal does not match, analyzing, by the computer, the voice signal to determine the voice signal features; and
   associating, by the computer, the voice signal features determined to a stored cluster of voice signal features of a particular geographic area.

3. The method of claim 2, further comprising:
selecting, by the computer, defined voice signal feature threshold values corresponding to the particular geographic area associated with the stored cluster; and
deleting, by the computer, the voice signal features extracted that are outside the defined voice signal feature threshold values.

4. The method of claim 1, further comprising:
determining, by the computer, whether one or more of the voice signal features extracted are already stored in a storage device; and
responsive to determining, by the computer, that the one or more of the voice signal features extracted are already stored in the storage device, deleting, by the computer, the one or more voice signal features extracted that are already stored in the storage device.

5. The method of claim 4, further comprising:
responsive to determining, by the computer, that the one or more voice signal features extracted are not already stored in the storage device, formatting, by the computer, the one or more voice signal features extracted for storage in the storage device; and
storing, by the computer, the one or more voice signal features extracted and formatted in the storage device.

6. The method of claim 1, further comprising:
transmitting, by the computer using the network, the average voice signal generated to a receiving voice communication device.

7. The method of claim 1, wherein the average voice signal generated and associated with the geographic area is within a predefined minimum value and a predefined maximum value of voice signal feature threshold values defined for the geographic area.

8. The method of claim 1, wherein the geographic area is defined by a map of geographic areas.

9. The method of claim 1, wherein the geographic area is defined by a map of area codes.

10. The method of claim 1, wherein the set of voice signal filters is a set of two or more combinable voice signal filters.

11. A computer system for modulating a voice signal, the computer system comprising:
a bus system;
a storage device connected to the bus system, wherein the storage device stores computer readable program code; and
a processor unit connected to the bus system, wherein the processor unit executes the computer readable program code to direct the processor unit to:
receive a voice signal representing a voice communication sent via a network from a voice communication device;
extract selected voice signal features including pitch, pace, pauses, frequency, amplitude, accent, inflection, speech pattern, phonemes, words, phrases, geographic origin, and geographic destination from the voice signal received;
select a set of voice signal filters used to modulate the voice signal features extracted of the voice signal received, to an average voice signal associated with a geographic area of a destination of the voice communication is destined for; and
modulate the voice signal features extracted from the voice signal received using the set of voice signal filters selected which modulate the voice features extracted to generate the average voice signal, of the voice signal received, associated with the geographic area of the destination of the voice communication.

12. The computer system of claim 11, wherein the processor unit further executes the computer readable program code to;
compare the voice signal received with voice signal samples stored in a storage device;
determine whether the voice signal received matches a voice signal sample of the voice signal samples stored corresponding to a geographic area which is an origin of the voice communication;
analyze the voice signal to determine the voice signal features in response to determining that the voice signal does not match; and
associate the voice signal features determined to a stored cluster of voice signal features of a particular geographic area.

13. The computer system of claim 12, wherein the processor unit further executes the computer readable program code to select defined voice signal feature threshold values corresponding to the particular geographic area associated with the stored cluster; and delete the voice signal features extracted that are outside the defined voice signal feature threshold values.

14. A computer program product for modulating a voice signal, the computer program product comprising a computer readable storage medium having program instructions embodied therewith, the program instructions executable by a computer to cause the computer to perform a method comprising:
receiving, by the computer, a voice signal representing a voice communication sent via a network from a voice communication device;
extracting, by the computer, selected voice signal features including pitch, pace, pauses, frequency, amplitude, accent, inflection, speech pattern, phonemes, words, phrases, geographic origin, and geographic destination from the voice signal received;
selecting, by the computer, a set of voice signal filters used to modulate the voice signal features extracted from the voice signal received, to an average voice signal associated with a geographic area of a destination of the voice communication; and
modulating, by the computer, the voice signal features extracted from the voice signal received using the set of voice signal filters selected which modulate the voice features extracted to generate the average voice signal, of the voice signal received, associated with the geographic area of the destination of the voice communication.

15. The computer program product of claim 14, further comprising:
comparing, by the computer, the voice signal received with voice signal samples stored in a storage device;
determining, by the computer whether the voice signal received matches a voice signal sample of the voice signal samples stored corresponding to a geographic area which is an origin of the voice communication;
responsive to determining, by the computer, that the voice signal does not match, analyzing, by the computer, the voice signal to determine the voice signal features; and
associating, by the computer, the voice signal features determined to a stored cluster of voice signal features of a particular geographic area.

16. The computer program product of claim 15, further comprising:
selecting, by the computer, defined voice signal feature threshold values corresponding to the particular geographic area associated with the stored cluster; and deleting, by the computer, the voice signal features extracted that are outside the defined voice signal feature threshold values.

17. The computer program product of claim 14, further comprising:
   determining, by the computer, whether one or more of the voice signal features extracted are already stored in a storage device; and
   responsive to determining, by the computer, that the one or more of the voice signal features extracted are already stored in the storage device, deleting, by the computer, the one or more voice signal features extracted that are already stored in the storage device.

18. The computer program product of claim 17, further comprising:
   responsive to determining, by the computer, that the voice signal features extracted are not already stored in the storage device, formatting, by the computer, the one or more voice signal features extracted for storage in the storage device; and
   storing, by the computer, the one or more voice signal features extracted and formatted in the storage device.

19. The computer program product of claim 14, further comprising:
   transmitting, by the computer using the network, the average voice signal generated to a receiving voice communication device.

20. The computer program product of claim 14, wherein the average voice signal generated and associated with the geographic area is within a predefined minimum value and a predefined maximum value of voice signal feature threshold values defined for the geographic area.

* * * * *